United States Patent
Vuong

(10) Patent No.: US 6,607,671 B2
(45) Date of Patent: Aug. 19, 2003

(54) REACTOR AND SOLIDS SETTLER FOR GREY WATER TREATMENT

(75) Inventor: Dinh-Cuong Vuong, Sugar Land, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/930,035

(22) Filed: Aug. 15, 2001

(65) Prior Publication Data

US 2003/0034310 A1 Feb. 20, 2003

(51) Int. Cl.[7] .............................. C02F 1/52; B01D 21/08
(52) U.S. Cl. ..................... 210/723; 210/738; 210/801; 210/205; 210/207; 210/519; 210/535
(58) Field of Search .................................. 210/723, 738, 210/801, 205, 207, 208, 255, 519, 532.1, 534, 535

(56) References Cited

U.S. PATENT DOCUMENTS

| | | | | |
|---|---|---|---|---|
| 1,030,366 A | * | 6/1912 | Winters | 210/207 |
| 2,361,283 A | * | 10/1944 | Good | 210/738 |
| 3,282,425 A |  | 11/1966 | Christiani | 210/83 |
| 3,397,788 A |  | 8/1968 | Duff et al. | 210/195 |
| 3,532,218 A | * | 10/1970 | Von Blottnitz et al. | 210/207 |
| 3,579,443 A | * | 5/1971 | Horst | 210/738 |
| 3,965,013 A |  | 6/1976 | Jackson | 210/519 |
| 4,290,898 A | * | 9/1981 | von Hagel et al. | 210/738 |
| 4,526,687 A | * | 7/1985 | Nugent | 210/205 |
| 4,605,678 A |  | 8/1986 | Brennan et al. |  |
| 4,818,392 A | * | 4/1989 | Werner et al. | 210/208 |
| 5,143,625 A |  | 9/1992 | Ballard | 210/713 |
| 5,147,556 A |  | 9/1992 | Taylor | 210/712 |
| 5,338,449 A | * | 8/1994 | Ichiyanagi et al. | 210/519 |
| 5,409,616 A |  | 4/1995 | Garbutt et al. | 210/760 |
| 5,415,673 A |  | 5/1995 | Hilton et al. | 48/197 |
| 5,645,726 A |  | 7/1997 | Pollock | 210/626 |
| 5,840,195 A | * | 11/1998 | Delsalle et al. | 210/738 |
| 5,904,855 A |  | 5/1999 | Manz et al. | 210/709 |
| 6,086,722 A |  | 7/2000 | Webster, Jr. et al. | 203/12 |

* cited by examiner

Primary Examiner—Christopher Upton
(74) Attorney, Agent, or Firm—Frank C. Turner

(57) ABSTRACT

The present invention involves an improved integrated reactor and solids settler system for solids removal from a water stream. The integration of the rapid mix reactor and the solids settler of the present invention uses an overflow line from the rapid mix reactor to eliminate both the rapid mix reactor level indicator and controller and the flow controller in the solids settler clarified water outlet. The proposed design is simple, cost effective, and eliminates the possibility of unnecessary downstream unit shutdowns.

18 Claims, 2 Drawing Sheets

REACTOR AND SOLIDS SETTLER FOR GREY WATER TREATMENT

BACKGROUND OF THE INVENTION

High pressure, high temperature gasification systems have been used to partially oxidize hydrocarbonaceous fuels to recover useful by-products or energy. The fuels can be admixed with water to form an aqueous feedstock that is fed to the reaction zone of a partial oxidation gasifier along with a oxygen containing gas and a temperature moderator.

Mixing the feed with water may not be necessary, given the composition and physical nature of the feedstock. Generally, solid carbonaceous fuels will need to be liquefied with oil or water prior to feeding to the gasifier. Liquid and gaseous hydrocarbonaceous fuels may be suitable for direct feed to the gasifier, but can be pre-treated for removal of any impurities that might be present in the feed.

The term liquid hydrocarbonaceous fuel as used herein to describe various suitable feedstocks is intended to include pumpable liquid hydrocarbon materials and pumpable liquid slurries of solid carbonaceous materials, and mixtures thereof. In fact, any combustible carbon-containing liquid organic material, or slurries thereof may be included within the definition of the term "liquid hydrocarbonaceous". For example, there are pumpable slurries of solid carbonaceous fuels, liquid hydrocarbon fuel feedstocks, oxygenated hydrocarbonaceous organic materials, and mixtures thereof. Gaseous hydrocarbonaceous fuels may also be burned in the partial oxidation gasifier alone or along with liquid hydrocarbonaceous fuel.

The partial oxidation reaction is preferably carried out in a free-flow, unpacked non-catalytic gas generator. Under high temperature and high pressure conditions, about 98% to 99.9% of the hydrocarbonaceous feedstock can be converted to a synthesis gas containing carbon monoxide and hydrogen, also referred to as synthesis gas or syngas. Carbon dioxide and water are also formed in small amounts.

Water is further used as quench water to quench the syngas. This quench water is also used to scrub particulate matter from the syngas and to cool and/or convey particulate waste solids, such as ash and/or slag out of the gasifier. In order to conserve water, gasification units reuse most of the quench water. A portion of the water is normally continuously removed as an aqueous effluent, grey water, purge wastewater or blowdown stream to prevent excessive buildup of solid materials and undesired dissolved solids.

The composition of the grey water discharged from the gasification system is fairly complex. This water can contain chlorides, ammonium salts, and other potentially environmentally harmful dissolved materials such as sulfide and cyanide. Thus, the effluent wastewater from the gasification system cannot be discharged to the environment without treatment and solids removal.

The grey water blowdown stream is discharged from the gasification system, and is treated with chemicals to precipitate impurities in the grey water. For example, Ferrous Sulfate ($FeSO_4$) can be added to produce an iron hydroxide floc ($Fe(OH)_2$) to remove any sulfide, cyanide and particulate matter. This process is usually done in a combination rapid mix reactor and solids settler. The chemicals are added to the rapid mix reactor where they are mixed with the grey water. The effluent from the rapid mix reactor is sent to the solids settler, where any precipitated solids and particulate matter are allowed to settle out of the grey water. After having the solids removed, the grey water can be subjected to ammonia stripping, biological treatment, or evaporation to produce a dry salt for commercial marketing and a distillate water. The water can then be recycled to the gasification quench process thereby eliminating any wastewater discharge from the plant.

Referring first to FIG. 1, a common prior art rapid mix reactor/solids settler integrated system is shown. Grey water from a gasification unit (not shown) is fed through line 10 to rapid mix reactor 14. Chemicals are also added to the rapid mix reactor 14 through any of lines 12. In rapid mix reactor 14, the grey water and the chemicals form a liquid level 22, that is stirred by mixer 16 which is driven by motor 18. Four baffle plates inside the rapid mix reactor provide thorough mixing. Rapid mix reactor 14 has a level indicator 20 which sends a signal to level controller 21, which is used to keep the level 22 of the grey water and chemicals as constant as possible.

The rapid mix reactor 14 effluent leaves out the bottom of the rapid mix reactor 14 through line 24 into the coagulation chamber 26 of solids settler 30. The coagulation chamber 26 is defined by a circular wall 28 in solids settler 30. In coagulation chamber 26 the solids and precipitates in the grey water are allowed to fall out of solution. The solids fall to the conical shaped bottom 32 of the solids settler 30, where they are removed via line 34 and are sent to a filter press (not shown).

Generally solid-free grey water, otherwise known as clarified water, leaves out the top of the solids settler 30 through line 36. Control valve 38 is positioned in line 36, and is controlled by level controller 21. After passing through control valve 38, the clarified water is sent through line 40 to a downstream processing unit for further treatment, usually an alkalization reactor (not shown).

In this prior art scheme of integrating the rapid mix reactor and the solids settler, the rapid mix reactor effluent flows out of the bottom of the rapid mix reactor 14 through line 24 and enters the center of the solids settler 30. Flow controller 38 is located in the clarified water outlet line 36 from the solids settler 30. The signal line of this flow controller 38 is connected to the level controller 21 of the rapid mix reactor 14, the objective of such an arrangement being to maintain the liquid level of grey water and chemicals in the rapid mix reactor 14. The failure of instrumentation in the rapid mix reactor 14 that could cause a high or low level in the rapid mix reactor 14 would cause the control valve 38 to have extreme swings from open to closed, sometimes causing the control valve 38 to swing wide open or go completely closed. This causes a harmful effect in the overall grey water treatment process. It can cause a low level in the downstream processing units, which can initiate the interlock system of those processing units which in turn shuts down those units, as well as the whole grey water treatment process.

Usually the combination of the rapid mix reactor and the solids settler is the first in many grey water process treatments. Common prior art systems such as the one described above control the integration of the rapid mix reactor and the solids settler in such a manner that can cause problems and process upsets in downstream process units. Thus, it would be desirable to develop an integrated rapid mix reactor/ solids settler system that efficiently removes solids and precipitates from the grey water while minimizing the possibilities of causing upsets in downstream grey water process equipment.

SUMMARY OF THE INVENTION

The present invention involves an improved integrated reactor and solids settler system for solids removal from a water stream. The integration of the rapid mix reactor and the solids settler of the present invention uses an overflow line from the rapid mix reactor to eliminate both the rapid mix reactor level indicator and controller and the flow controller in the solids settler clarified water outlet. The proposed design is simple, cost effective, and eliminates the possibility of unnecessary downstream unit shutdowns.

DESCRIPTION OF ILLUSTRATIVE EMBODIMENTS

The inventive integration of the rapid mix reactor and the solids settler involves a unique system of interaction between the two process units. The design of the present invention uses an overflow line from the rapid mix reactor to eliminate both the rapid mix reactor level indicator and controller and the flow controller in the solids settler clarified water outlet. The proposed design is simple, cost effective, and eliminates the possibility of unnecessary unit shutdowns.

Figure 1:
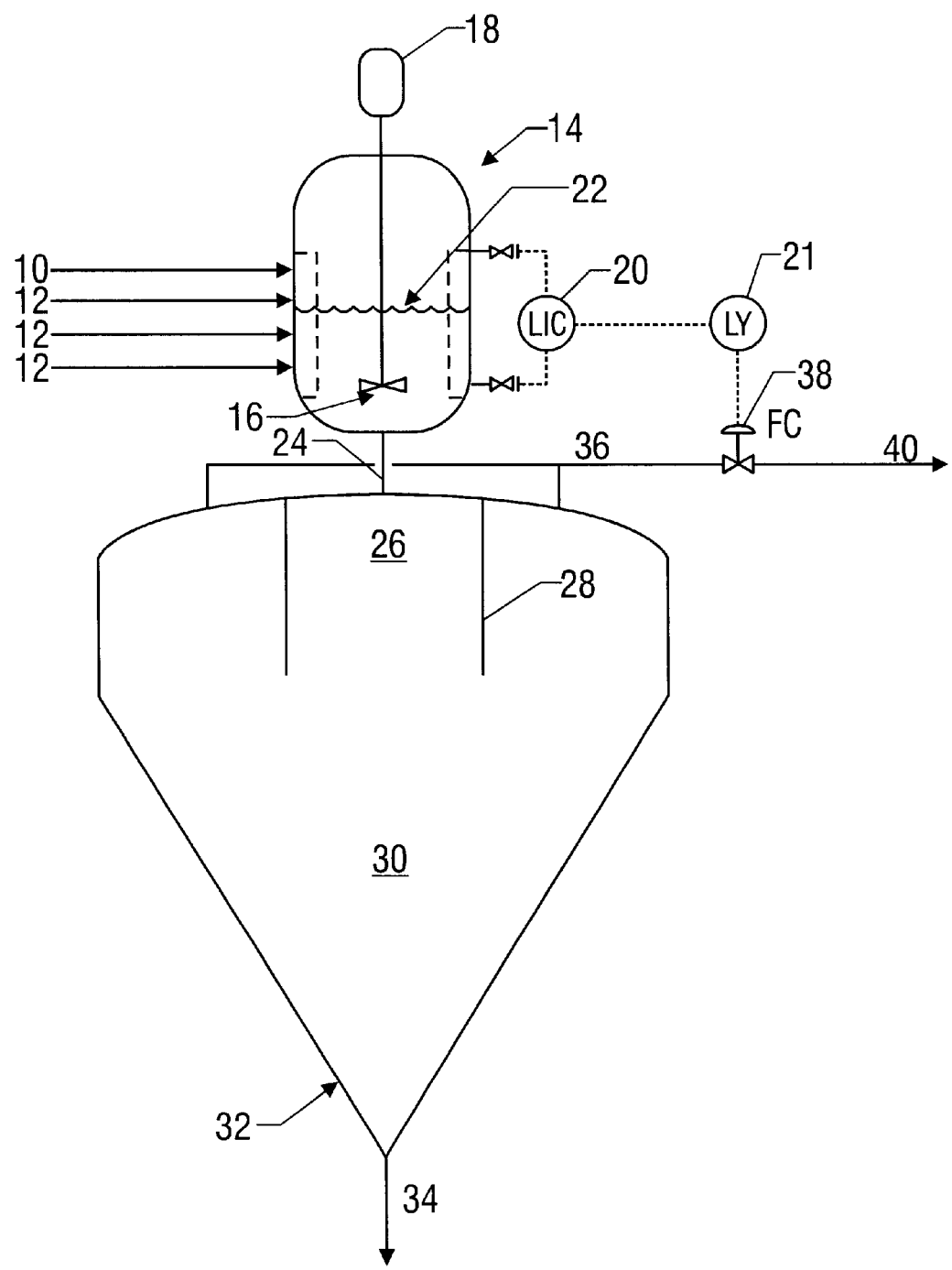
FIG. 1 illustrates a common prior art process of integrating a rapid mix reactor and a solids settler.
Figure 2:
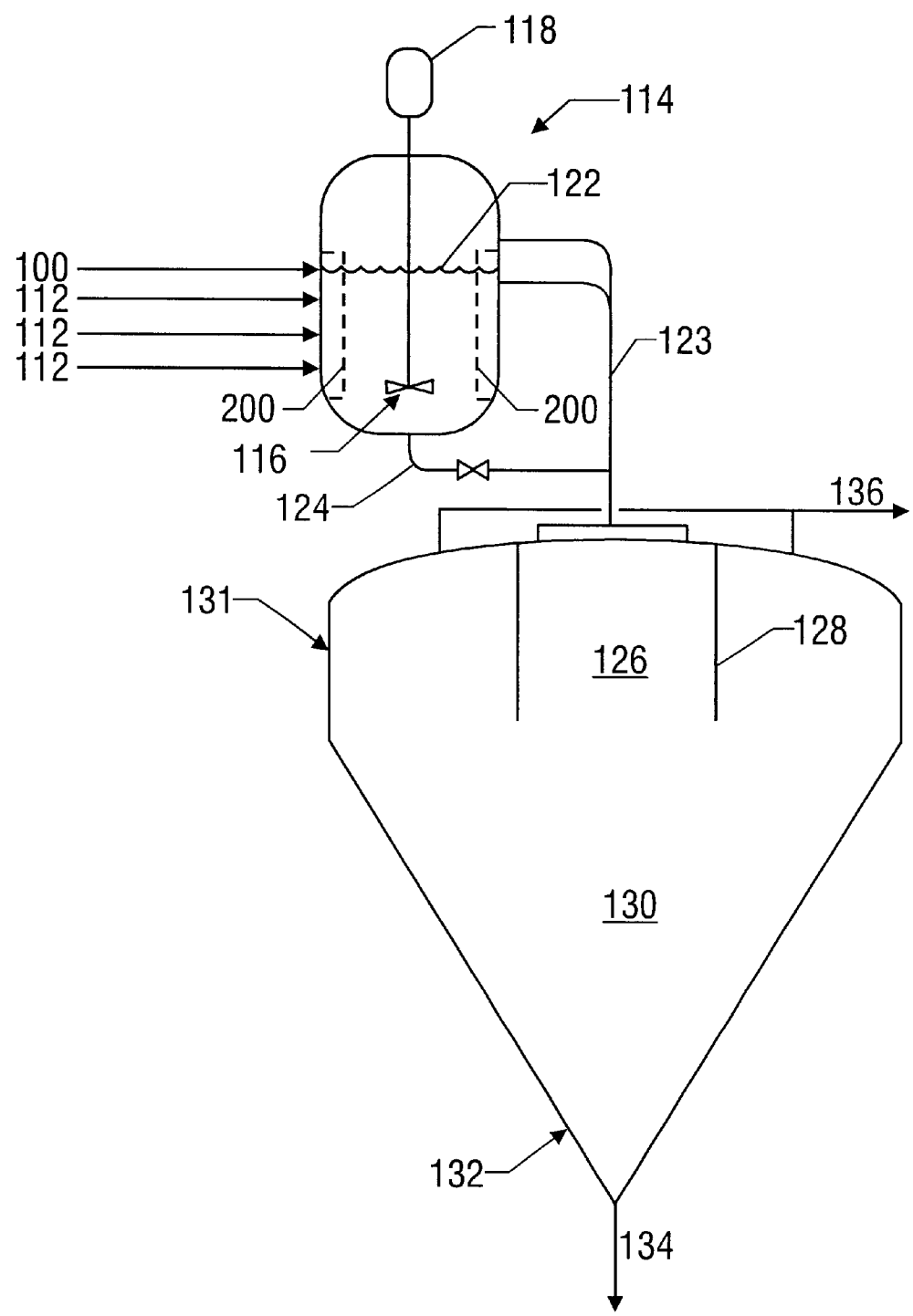
FIG. 2 shows a preferred embodiment of the present invention, providing an improved integration scheme of combining a rapid mix reactor and a solids settler.

Referring now to FIG. 2, one embodiment of the rapid mix reactor/solids settler integrated system of the present invention is shown. Grey water from a gasification unit (not shown) is fed through line 100 to rapid mix reactor 114. Chemicals are also added to the rapid mix reactor 114 through any of lines 112. Ferrous Sulfate ($FeSO_4$) can be added to produce an iron hydroxide floc ($Fe(OH)_2$) to remove any sulfide, cyanide and particulate matter. Other chemicals, such as caustic (NaOH) and a flocculant or/and coagulant polymer can also be added to assist in the precipitation of the sulfides, cyanides and particulate matter. The optimum polymer type and dosage rate are generally dependent on the nature of the treated grey water, and such determination is within the capabilities of one of ordinary skill in the art.

The primary reactions occurring in the rapid mixture that affect the settling process are summarized below:

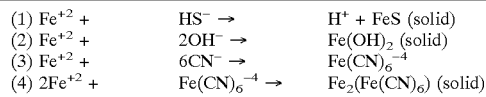

| (1) $Fe^{+2}$ + | $HS^-$ → | $H^+$ + FeS (solid) |
| (2) $Fe^{+2}$ + | $2OH^-$ → | $Fe(OH)_2$ (solid) |
| (3) $Fe^{+2}$ + | $6CN^-$ → | $Fe(CN)_6^{-4}$ |
| (4) $2Fe^{+2}$ + | $Fe(CN)_6^{-4}$ → | $Fe_2(Fe(CN)_6)$ (solid) |

In rapid mix reactor 114, the grey water and the chemicals form a liquid level 122, that is stirred by static mixer 116 which is driven by motor 118. The mixing can be assisted by a baffle plate system 200 within the rapid mix reactor 114. The rapid mix reactor 114 effluent leaves through overflow line 123 out the side of the rapid mix reactor 114 through line into the coagulation chamber 126 of solids settler 130. Thus, the need for a level controller is eliminated, and only the volume of material entering the rapid mix reactor 114 will leave through overflow line 123. Thus, the position of the overflow line 123 on the reactor 114 keeps the liquid level in the reactor constant at a position near the inlet to the overflow line 123. Assuming that the feed to the reactor 114 is kept constant, there will be no swings level 122 and likewise there will be no swings in the outlet flow of clarified water in line 136, thus eliminating the possibility of causing interlocks on downstream process units to shutdown the grey water treatment process. Only one overflow line is shown in the drawing, but it is within the contemplation of this invention that a plurality of overflow lines be used to remove water from the reactor.

Rapid mix reactor 114 is also equipped with a line 124 which allows for material to be removed from the reactor 114 from the bottom of the reactor. This is useful for draining the reactor at times when the unit is being shutdown and isolated, or if any solids happen to accumulate in the bottom of the rapid mix reactor 114, they can be removed through line 124. Line 124 is normally not in service, and thus is equipped with a block valve that will normally be in the closed position so that the only material leaving the rapid mix reactor 114 will be through overflow line 123.

Overflow line 123 feeds solids settler 130. Solids settler 130 is preferably made up of an upper cylindrical portion 131 and a conical shaped lower portion 132. Overflow line 123 feeds the rapid mix reactor effluent into coagulation chamber 126, which is defined by a wall 128 within solids settler 130. Preferably, the coagulation chamber is situated concentrically within the upper cylindrical portion of the solids settler 130. In coagulation chamber 26 the solids and precipitates in the grey water are allowed to fall out of solution. The solids fall to the conical shaped bottom 132 of the solids settler 130, where they are removed via sludge outlet line 34 and are sent to a filter press (not shown).

Generally solid-free grey water, otherwise known as clarified water, leaves out the top of the solids settler 130 through a plurality of liquid outlet means and into line 136. Because there is no control valve positioned in line 136, the clarified water passes directly to any downstream processing units, usually an alkalization reactor (not shown). This process scheme eliminates the capital, construction and maintenance costs that are associated with the level control loop known in prior art rapid mix reactor/solids settler processes.

As disclosed herein, one of ordinary skill in the art should appreciate that the present invention encompasses an apparatus comprising a reactor comprising a plurality of reactor inlet means, a mixing means, and a plurality of overflow lines; a settler comprising a plurality of settler inlet means, a coagulation chamber, a sludge outlet means, and a plurality of liquid outlet means; and a transfer conduit connecting the plurality of overflow lines and the plurality of settler inlet means,wherein the plurality of overflow lines are located on the reactor where a liquid level in the reactor is to be maintained, and a flow of liquid through the plurality of liquid outlet means is not adjusted so as to control a level of liquid in the reactor.

At least one of the plurality of reactor inlet means is a feed inlet means, and at least one of the plurality if reactor inlet means is a chemical inlet means. The mixing means preferably comprises a motor driven mixer and may further comprise a baffle plate system. The settler may comprise an upper cylindrical portion and a lower conical portion, wherein the sludge outlet means is located at the lowermost portion of the lower conical portion of the settler, and the coagulation chamber is positioned concentrically within the upper cylindrical portion of the settler. The reactor may further comprise a reactor bottom outlet means located at the bottom most portion of the reactor, a reactor bottom conduit connecting the reactor outlet means to the transfer conduit, and a reactor bottom valve located within the reactor bottom conduit.

The scope of the present invention further covers a method comprising supplying a plurality of feeds to a reactor through a plurality of reactor inlet means in the reactor; mixing the plurality of feeds within the reactor forming a feed mixture; removing the feed mixture from the reactor through a plurality of overflow lines, wherein the plurality of overflow lines are located on the reactor where a feed mixture liquid level in the reactor is to be maintained; transferring the feed mixture to a settler, wherein the feed mixture is introduced into a coagulation chamber in the settler through a plurality of settler inlet means; allowing solids to settle out of the feed mixture and accumulate in the bottom of the settler, forming clarified water; removing the solids from the settler through a sludge outlet means; and removing the clarified water from the settler through a plurality of liquid outlet means, wherein the flow of clarified water through the plurality of liquid outlet means is not adjusted so as to control the feed mixture liquid level in the reactor.

At least one of the plurality of feeds comprises water, and another comprises chemicals that assist in the precipitation of particulate matter in the feed. Preferably the chemicals are selected from a group consisting of Ferrous Sulfate ($FeSO_4$), caustic (NaOH) and a coagulant polymer that assist in the precipitation of particulate matter in the feed. A motor driven mixer may be used for mixing the plurality of feeds within the reactor, possibly in conjunction with a baffle plate system. The settler may comprise an upper cylindrical portion and a lower conical portion, with the sludge outlet means being located at the lowermost portion of the lower conical portion of the settler and the coagulation chamber being positioned concentrically within the settler.

While the apparatus and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention. In particular, it should be noted that although the preferred embodiments were described as a treatment for grey water from a gasification process, the apparatus and methods of this invention can be used for any type of solids removal system that uses an integrated rapid mix reactor/solids settler system or variation thereof.

What is claimed is:

1. An apparatus for treating and removing solids from grey water generated in a high pressure, high temperature gasification system, the apparatus comprising:
    a reactor comprising a plurality of reactor inlet means, a mixing means, and a plurality of overflow lines;
    a settler comprising a plurality of settler inlet means, a coagulation chamber, a sludge outlet means, and a plurality of liquid outlet means; and
    a transfer conduit connecting the plurality of overflow lines and the plurality of settler inlet means,
    wherein the plurality of overflow lines are located on the side of the reactor where a liquid level in the reactor is to be maintained, and a flow of liquid through the plurality of liquid outlet means is not adjusted so as to control a level of liquid in the reactor.

2. The apparatus of claim 1 wherein at least one of the plurality of reactor inlet means is a feed inlet means.

3. The apparatus of claim 1 wherein at least one of the plurality if reactor inlet means is a chemical inlet means.

4. The apparatus of claim 1 wherein the mixing means comprises a motor driven mixer.

5. The apparatus of claim 4 wherein the mixing means further comprises a baffle plate system.

6. The apparatus of claim 1 wherein the settler comprises an upper cylindrical portion and a lower conical portion.

7. The apparatus of claim 6, wherein the sludge outlet means is located at the lowermost portion of the lower conical portion of the settler.

8. The apparatus of claim 6, wherein the coagulation chamber is positioned concentrically within the supper cylindrical portion of the settler.

9. The apparatus of claim 1 wherein the reactor further comprises a reactor bottom outlet means located at the bottom most portion of the reactor, a reactor bottom conduit connecting the reactor outlet means to the transfer conduit, and a reactor bottom valve located within the reactor bottom conduit.

10. A method for treating and removing solids from grey water generated in a high pressure, high temperature gasification system, the method comprising:
    supplying a plurality of feeds to a reactor through a plurality of reactor inlet means in the reactor;
    mixing the plurality of feeds within the reactor forming a feed mixture;
    removing the feed mixture from the reactor through a plurality of overflow lines, wherein the plurality of overflow lines are located on the reactor where a feed mixture liquid level in the reactor is to be maintained;
    transferring the feed mixture to a settler, wherein the feed mixture is introduced into a coagulation chamber in the settler through a plurality of settler inlet means;
    allowing solids to settle out of the feed mixture and accumulate in the bottom of the settler, forming clarified water;
    removing the solids from the settler through a sludge outlet means; and
    removing the clarified water from the settler through a plurality of liquid outlet means, wherein the flow of clarified water through the plurality of liquid outlet means is not adjusted so as to control the feed mixture liquid level in the reactor.

11. The method of claim 10 wherein at least one of the plurality of feeds comprises water.

12. The method of claim 10 wherein at least one of the plurality feeds comprises chemicals that assist in the precipitation of particulate matter in the feed.

13. The method of claim 12, where the chemicals are selected from a group consisting of Ferrous Sulfate ($FeSO_4$), caustic (NaOH) and a coagulant polymer that assist in the precipitation of particulate matter in the feed.

14. The method of claim 10 wherein a motor driven mixer is used for mixing the plurality of feeds within the reactor.

15. The method of claim 14 wherein a baffle plate system is used in conjunction with the motor driven mixer for mixing the plurality of feeds within the reactor.

16. The method of claim 10 wherein the settler comprises an upper cylindrical portion and a lower conical portion.

17. The method of claim 16, wherein the sludge outlet means is located at the lowermost portion of the lower conical portion of the settler.

18. The method of claim 10, wherein the coagulation chamber is positioned concentrically within the settler.

* * * * *